April 16, 1935.  P. E. WIBERG  1,998,035
DOUBLE SNAP HOOK FOR FISHING TACKLE
Filed Nov. 8, 1934
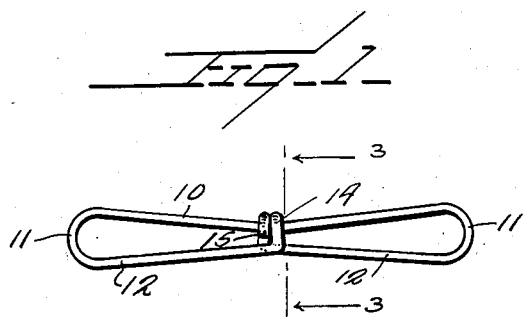
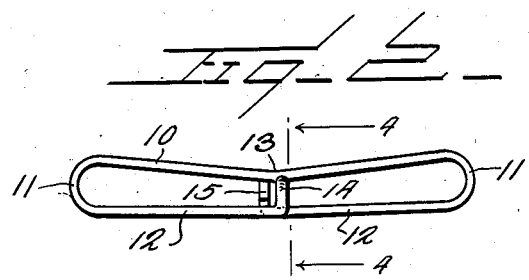
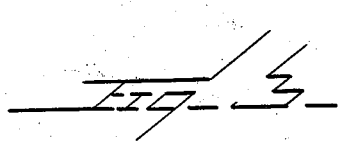   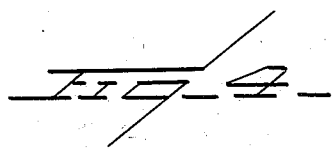
Inventor
P. E. Wiberg
By Frederick S. Stitt
Attorney Patented Apr. 16, 1935

1,998,035

UNITED STATES PATENT OFFICE 1,998,035

DOUBLE SNAP-HOOK FOR FISHING TACKLE

Peter E. Wiberg, Newark, N. J.

Application November 8, 1934, Serial No. 752,133

2 Claims. (Cl. 24—230.5)

This invention relates to "snaps" as they are known in the fishing tackle art and particularly to a double "snap" or snap-hook.

"Snaps" of this character are used on leaders for fishing lines or between swivels and the lines and particularly in connection with fishing tackle used for trolling. Under these circumstances the snap-hook must be so constructed that it will not open accidently and under strain but only by positive manual manipulation. These snap-hooks are ordinarily made very much like the ordinary safety pin and they are liable to open under excessive strain, the wire bending until the free extremity of the wire comes out of the sheath or guard.

The general object of the present invention is to provide a snap-hook which is double, that is, which is so formed as to provide two eyes integrally connected to each other, the length of wire being rebent upon itself to form two spring shanks constituting one side of these eyes, these shanks at their free extremities being bent to form open hooks disposed in planes at right angles to the length of the snap-hook and these hooks being adapted to engage over the body of the wire and when so engaged to bear against each other so that any strain tending to open either of the eyes is resisted by the engagement of the corresponding hook with the opposed hook, thus making it impossible to open the hook except by positive manual manipulation.

My invention is illustrated in the accompanying drawing, wherein:—

Figure 1 is an elevation of my double snap-hook, the hook being closed.

Figure 2 is a like view to Figure 1 but showing the two shanks of the hook opened.

Figure 3 is a section on the line 3—3 of Figure 1 on an enlarged scale.

Figure 4 is an enlarged section on the line 4—4 of Figure 2.

Referring to the drawing it will be seen that my snap-hook is formed of a single length of wire, this being particularly evident from Figure 2, the single length of wire being rebent at its ends. The body of the wire is designated 10, the bends at the ends of the body of wire are designated 11 and the shanks 12 extend in approximate parallel relation to the body of the wire, although preferably the body of the wire will be bent outward from a medial point 13, as shown most clearly in Figure 2.

The free extremity of each shank is bent at right angles to the shank, as shown in Figures 3 and 4 at 14, this angularly bent portion extending toward the body 10 of the snap-hook and then extending downward at 15 so as to form the downwardly facing open hooks which, when the shank portions 12 are forced inward, are adapted to engage over the body 10 of the snap. It is to be understood that the term downwardly opening hook refers to the position of the parts, as shown in Figures 1 and 2.

When the shanks are disposed with their hooked portions engaging over the body 10 of the snap fastener, the resilience of the bends 11 and of the shanks 12 draws the hooks into firm engagement with the body portion 10. If strain in opposite directions is applied to the device, there will be no tendency of either one of the loops or eyes to open. The tension applied to both eyes acts to pull the hooks downward in Figure 1 or 2 and the wire cannot bend so as to open the loops or eyes because of the engagement of one hook in front of the other hook so that any tendency for one loop or eye to elongate is prevented by the hook of that eye engaging against the hook of the other eye so that the strains are balanced, and resisted and, of course, there can be no strain which would tend to open the hooks 14—15. Of course, either eye may be opened by pressing inward upon the corresponding shank 12 and then when the hook 15 has escaped the body portion of the wire 10, the hook is shifted laterally by the fingers and is then fully open, as shown in Figure 2.

It is, of course, to be understood that Figures 3 and 4 are somewhat exaggerated to more clearly show the formation of the hooks 14 and 15.

Double snap hooks of this character have been thoroughly tested and found to withstand any pulling strain within the strength of the wire itself. Snap-hooks of this character cannot become accidently opened because of the fact that one hook shaped portion bears against the other hook shaped portion and the two loops so formed are connected as if a single closed loop was provided.

Devices of this kind can obviously be very cheaply made, can be made of different sizes and can be made of different weights of wire, depending upon the tackle to which the double snap-hook is intended to be used.

Having described my invention, what I claim is:—

1. A double snap-hook of the character described, formed of a single length of wire, the length of the wire being rebent upon itself at its opposite end portions to form opposed loops and then extended approximately parallel to the body of the snap to form resilient shanks, the extremities of the shanks extending past each other and each being provided with a hook portion extending in a plane at right angles to the length of the shank and toward the body of the snap-hook, the hook portions opening toward the shanks, said hook portions, when engaged around the wire forming the body of the double snap-hook bearing against each other whereby to prevent the loops from opening under strain.

2. A double snap-hook of the character described, formed of a single length of wire, the wire being rebent upon itself at its opposite end portions to form opposed loops and then extended to form shanks extending parallel to the body of the wire, the shanks extending beyond each other and being formed with hook shaped portions to engage over the body of wire adjacent the middle thereof and to engage with each other and bear against each other when hooked over the body of the wire to thereby prevent the loops from opening under strain, the body of wire being bent at an obtuse angle from the middle thereof whereby the eyes formed on each side of the middle of the hook are larger at their outer ends than at their inner.

PETER E. WIBERG.